(12) United States Patent
Winkler

(10) Patent No.: US 7,438,151 B2
(45) Date of Patent: Oct. 21, 2008

(54) METHOD FOR LIMITING DAMAGES IN THE EVENT OF A PARTIALLY OVERLAPPING FRONTAL COLLISION, AND MOTOR VEHICLE COMPRISING A CORRESPONDING DEVICE

(75) Inventor: Stephan Winkler, Graz (AT)

(73) Assignee: Magna Steyr Fahrzeugtechnik AG & Co KG (AT)

( * ) Notice: Subject to any disclaimer, the term of this patent is extended or adjusted under 35 U.S.C. 154(b) by 394 days.

(21) Appl. No.: 10/478,556

(22) PCT Filed: May 17, 2002

(86) PCT No.: PCT/AT02/00152

§ 371 (c)(1),
(2), (4) Date: May 3, 2004

(87) PCT Pub. No.: WO02/094618

PCT Pub. Date: Nov. 28, 2002

(65) Prior Publication Data

US 2004/0182628 A1    Sep. 23, 2004

(30) Foreign Application Priority Data

May 21, 2001   (AT) ............................... GM418/2001

(51) Int. Cl.
*B60R 21/01* (2006.01)
(52) U.S. Cl. ...................... 180/274; 180/271; 701/301; 701/41

(58) Field of Classification Search ................. 180/271, 180/274, 232; 280/86.758, 5.522; 701/301, 701/41
See application file for complete search history.

(56) References Cited

U.S. PATENT DOCUMENTS

| 2,751,995 | A | | 6/1956 | Kastory | |
|---|---|---|---|---|---|
| 5,275,436 | A | | 1/1994 | Pomero | |
| 5,482,322 | A | * | 1/1996 | Wheatley et al. | ............ 280/784 |
| 6,516,258 | B1 | * | 2/2003 | Herrmann | ..................... 701/45 |
| 6,877,579 | B1 | * | 4/2005 | Håland | ........................ 180/274 |
| 2001/0032748 | A1 | * | 10/2001 | Demerly | ..................... 180/402 |

FOREIGN PATENT DOCUMENTS

| DE | 527281 | 6/1931 |
|---|---|---|
| DE | 44 00 547 | 2/1995 |
| DE | 195 32 858 | 2/1997 |
| DE | 199 23 708 | 11/2000 |

(Continued)

*Primary Examiner*—Ruth Ilan
(74) *Attorney, Agent, or Firm*—Bachman & LaPointe, P.C.

(57) ABSTRACT

A method for damage limitation in a partially overlapping frontal collision of two motor vehicles involves a signal indicating the start of a collision or an imminent collision causing the steerable front wheels (9, 10) to be turned in such a manner that the wheel plane (34) of the collision-side wheel (9) intersects the vertical longitudinal central plane (33) of the vehicle at a point (36) in front of said vehicle. For this purpose, a connecting element (17) provides for the rapid build up of pressure in the steering device (13-16), and, in the event of a collision, the connecting element (17) acts on the steering device (13-16) in such a manner that at least the collision-side front wheel (9) is turned in a positive direction.

14 Claims, 3 Drawing Sheets

FOREIGN PATENT DOCUMENTS

| | | | |
|---|---|---|---|
| DE | 100 32 711 | | 1/2002 |
| DE | 10032711 A | * | 1/2002 |
| FR | 2256655 | | 7/1975 |
| JP | 56-34547 A | * | 4/1981 |
| JP | 05-085414 | | 4/1993 |
| JP | 08-310444 | | 11/1996 |
| WO | WO 98/22328 | | 5/1998 |
| WO | WO 01/26922 A1 | * | 4/2001 |

* cited by examiner

METHOD FOR LIMITING DAMAGES IN THE EVENT OF A PARTIALLY OVERLAPPING FRONTAL COLLISION, AND MOTOR VEHICLE COMPRISING A CORRESPONDING DEVICE

The invention relates to a method for damage limitation in a partially overlapping frontal collision of two motor vehicles and to a motor vehicle having a device used for this purpose. A partially overlapping frontal collision is understood to be a frontal collision in which the vehicles move toward each other with directional vectors which are essentially parallel but are offset laterally with respect to each other. The collision zone is therefore just a lateral part of the front end of the vehicle.

In vehicles, this lateral part in front of the passenger cell is usually less stiff than the central part in front of the passenger cell and also absorbs less collision energy, with the result that the deformations for the passenger cell are considerable. In particular, there is the risk of the particular wheel penetrating the passenger compartment. Furthermore, in collisions of this type, another particularly hazardous phenomenon generally occurs: even if there is a relatively small overlap, the collision-side front wheels of the two vehicles become interlocked; one wheel at least of the one vehicle collides with the wheel suspension of the other, and vice versa. As a result, not only do particularly strong longitudinal forces act on the wheels pushing them into the passenger compartment, but the two vehicles are connected to each other (at least partially) in an interlocking manner and are thus prevented from sliding past each other. In addition, the two interlocked vehicles are jointly also caused to twist about the vertical axis.

This phenomenon is known in the literature under the term "interlocking". DE 195 32 858 A1 discloses, as a countermeasure, designing the front bumper to be greatly rounded in the side region, in plan view, and to be sufficiently stiff that it prevents the collision-side front wheels from coming into contact and causes the two vehicles to slide along each other. It is conceivable that the bumper may never be strong enough for this purpose at the collision speeds customary nowadays. In addition, the bumper also has to satisfy other safety requirements which contradict it: a collision surface which is as wide as possible when the frontal collision is completely overlapping and proportional yielding in a collision with a pedestrian.

U.S. Pat. No. 5,275,436 furthermore discloses providing, in front of and behind the front wheels, approximately vertical deflecting plates which are aligned and curved in the horizontal in such a manner that they positively pivot the wheel inward in the event of a collision. However, these deflecting plates also have to be of very heavy construction if they are actually to have this effect, and they likewise require a particularly heavy bumper involving the above-mentioned disadvantages.

The invention is based on the object of bringing about an inward pivoting of the front wheels in such a manner that, while keeping the outlay on construction and increase in weight to a minimum, the satisfying of the other safety requirements is not impaired as a result.

The method according to the invention involves a signal indicating the start of a collision or an imminent collision triggering the discharging of an energy source which causes at least one of the steerable front wheels to be turned in such a manner that the wheel plane of the collision-side wheel intersects the vertical longitudinal central plane of the vehicle in front of said vehicle. The energy source may be a high-pressure store for a suitable fluid or a chemical or pyrotechnical energy source. The "positive" steering lock, which therefore occurs in a flash, of the collision-side wheel enables the latter not to become interlocked in the collision partner, and, in particular, not in its collision-side wheel; on the contrary, the outside of the rim of the wheel acts as a protective shield along which the other vehicle, or its collision-side wheel, slides.

If the impact wheel should be pushed back because of the collision, the positively turned wheel rim forms a compact bond with the surrounding, impact-side vehicle structures (wheel suspension, longitudinal member, sill). The favorable conditions for sliding which are brought about by the positive steering lock and are in the form of a constant "slight" sliding taper are therefore maintained during the entire collision.

The countermeasure according to the invention can be withheld in terms of time and takes place very rapidly with relatively small forces, since the steering device and the axle geometry are already configured for normal operation in such a manner that they manage and operate precisely using as little force as possible.

In a development of the invention, the two front wheels can be turned in an opposite direction (claim 2). This means that a differentiation depending on the side of the vehicle at which the collision takes place is unnecessary.

Even if, in the case of right-hand traffic, a collision with an overlap on the left side is the more probable, there may still be trees along the right edge of the road. Even if there are collision partners of this type, the method according to the invention displays the desired effect. Moreover, the wheel which is not involved in the collision and is turned in the opposite direction counteracts the twisting, which is imparted during the sliding, around the vertical axis.

The signal indicating the start of a collision or an imminent collision can be output by a deceleration sensor arranged in front of the wheel (claim 3) or by a proximity detector (claim 4). The former arrangement is simple and sufficient if the vehicle overhangs sufficiently to the front. In this case, a deceleration sensor can be mounted in front of each wheel, or one common sensor can be provided. The second arrangement is especially advantageous if a proximity detector is provided in any case for other safety functions.

A motor vehicle according to the invention having steerable front wheels and a steering device is distinguished by the fact that a connecting element having means for the rapid build up of a pressure is provided in the steering device, which means that, in the event of a collision, the connecting element acts on the steering device in such a manner that at least the collision-side front wheel is turned in the positive direction (claim 5). The means for the rapid build up of a pressure are preferably explosive charges which are ignited by a control command (claim 6).

The intervention in the steering device can be undertaken in accordance with the type of steering device. In the case of a motor vehicle having a steering tie rod which is, as a rule, interrupted, the connecting elements are fitted between a part of the steering tie rod leading to the one front wheel and a part of the steering tie rod leading to the other front wheel (claim 7). If the steering tie rod is arranged behind the front axle, in the event of a collision, the connecting elements increase the distance between that part of the steering tie rod which leads to the one front wheel and that part of the steering tie rod which leads to the other front wheel (claim 8). If the steering tie rod is arranged in front of the front axle, they reduce the distance (claim 9).

In the case of a motor vehicle having a rack-and-pinion steering system, the connecting elements are fitted between the steering rack and a part of the steering tie rod leading to a front wheel (claim 10). If appropriate, a dedicated connecting element is provided for each wheel.

The invention will be described and explained below with reference to drawings, in which.

Figure 1:
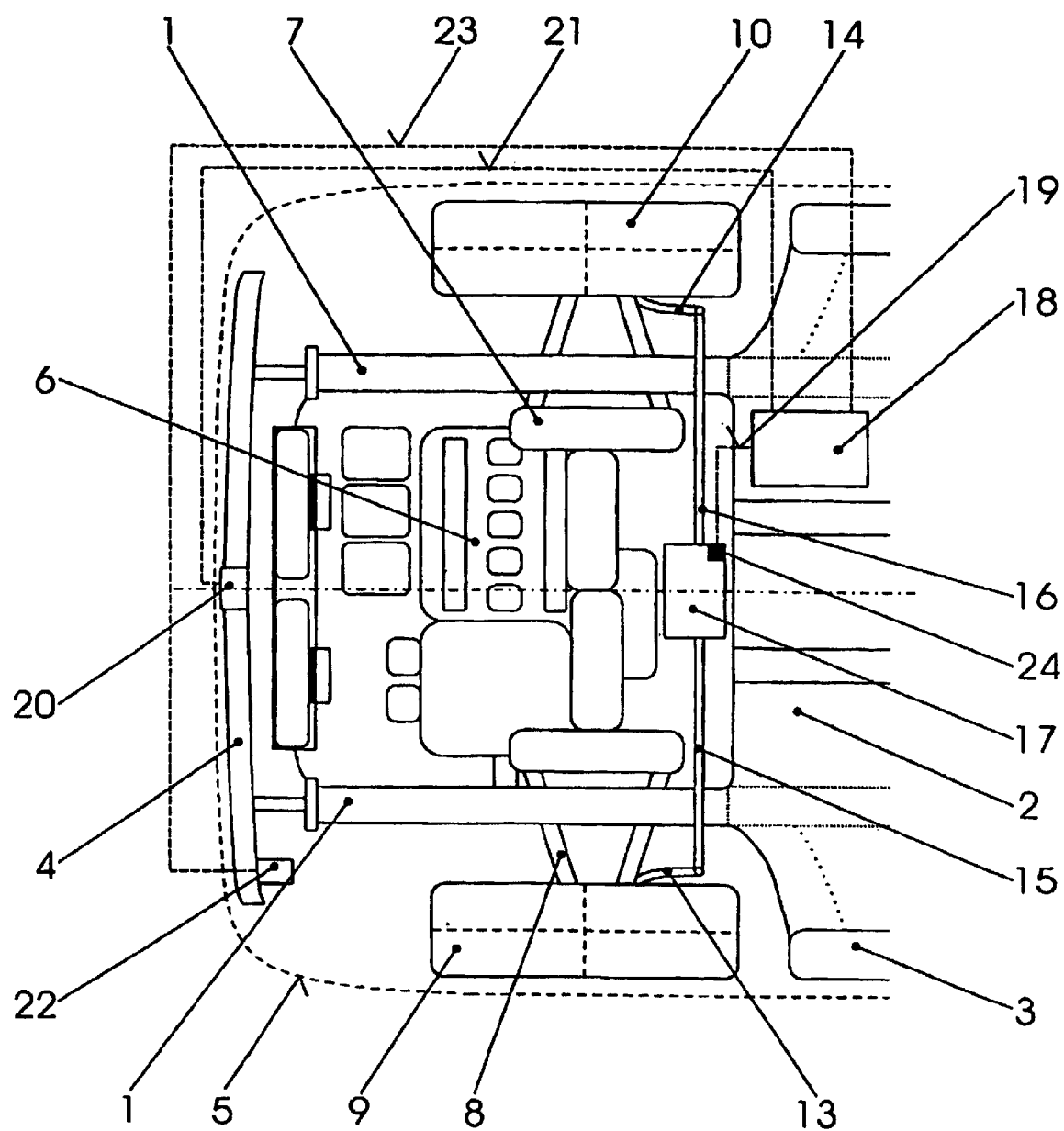
FIG. 1 shows a vehicle according to the invention.

FIG. 1 shows, schematically, the front part of a motor vehicle set up for the method according to the invention. The front part comprises frame longitudinal members 1 which adjoin a floor plate 2 which, for its part, is bounded laterally by sills 3. The front end of the motor vehicle is formed by a bumper 4 which follows the front part of the vehicle contour 5 (dashed lines). An engine-transmission unit 6 is merely indicated. Transverse links 8, for example, are guided on suspension bearings 7, which are fastened to the frame longitudinal members or are part of a chassis sub-frame. A left front wheel 9 and a right front wheel 10 are in this way suspended.

The two front wheels 9, 10 can be pivoted in the customary manner by means of steering drop arms 13, 14 on which a left steering tie rod 15 and a right steering tie rod 16 act. A connecting element 17 according to the invention, which is activated by a control unit 18 via a command line 19, is provided between these steering tie rod parts 15, 16. The activation comprises a pulse which causes, for example, an explosive charge 24 provided in the connecting element 17 to detonate.

As an alternative, a high-pressure store is conceivable in its place. In the exemplary embodiment shown, the steering mechanism itself is not illustrated at all. It acts either on the two steering tie rod parts 15, 16 or on a steering drop arm. The former case frequently concerns a rack-and-pinion steering system. Depending on the type of construction of a steering system of this type, connecting elements according to the invention could also be provided on each side between the steering mechanism of said system and the steering tie rod parts 15, 16.

There are various possibilities for indicating the start of a collision or an imminent collision, two alternative possibilities being indicated in FIG. 1. Either a proximity sensor 20 is provided in the bumper 4 and is connected via the signal line 21 to the control unit 18, in which an evaluation and discrimination of the signals supplied by the proximity sensor 20 then also takes place. As an alternative, deceleration sensors 22 which are connected via signal lines 23 to the control unit 18 are provided at suitable locations, i.e. as far in front of the wheels 9, 10 as possible.

Figure 2:
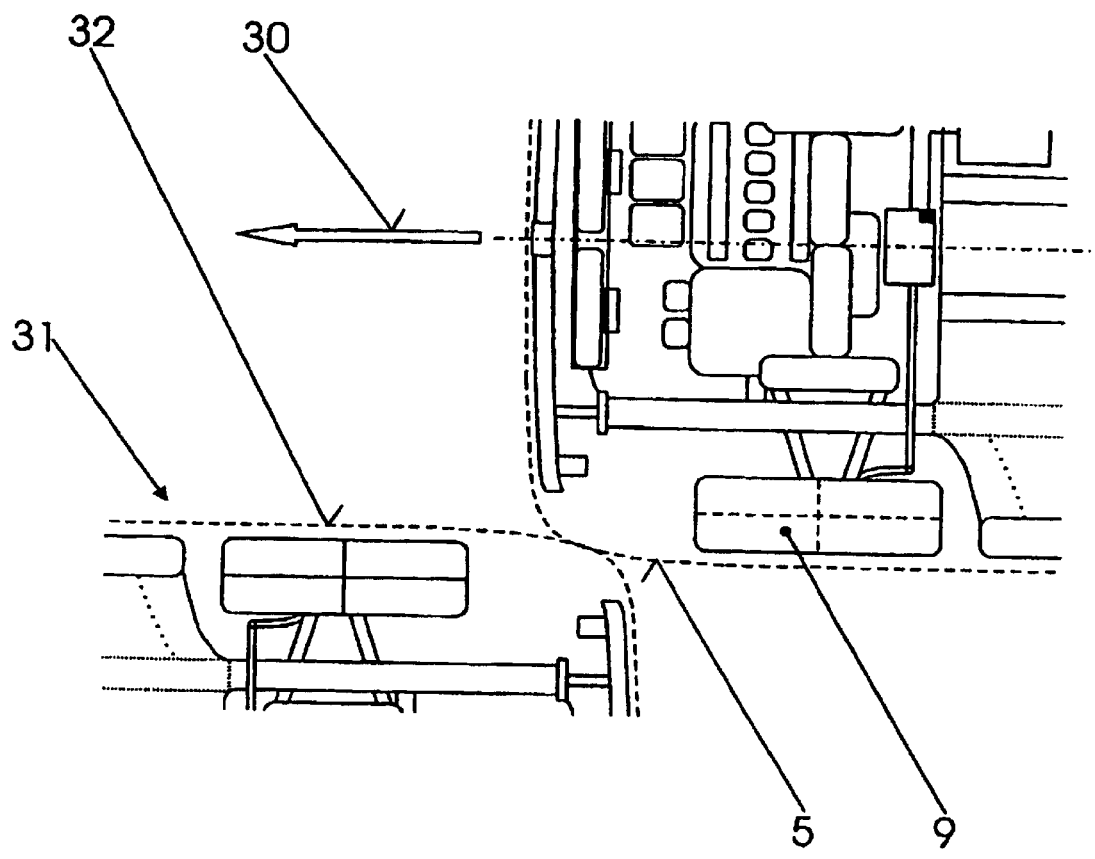
FIG. 2 shows the same in a first phase, before a collision.

FIG. 2 shows the motor vehicle 30, which is set up in accordance with the invention and is moving in the direction and speed shown by the arrow 30, directly before a partially overlapping frontal collision with a collision partner 31, the contour 32 of which is likewise indicated by dashed lines. The collision partner 31 does not need to be set up in accordance with the invention, although it is better for it if it also is. At this moment, the proximity sensor 20 (FIG. 1) has already indicated the imminent collision and a deceleration sensor 22 (FIG. 1) is in the process of responding. The explosive charge 24 (FIG. 1) is ignited and the two front wheels 9, 10, of which only the collision-side front wheel 9 can now be seen, are turned.

Figure 3:
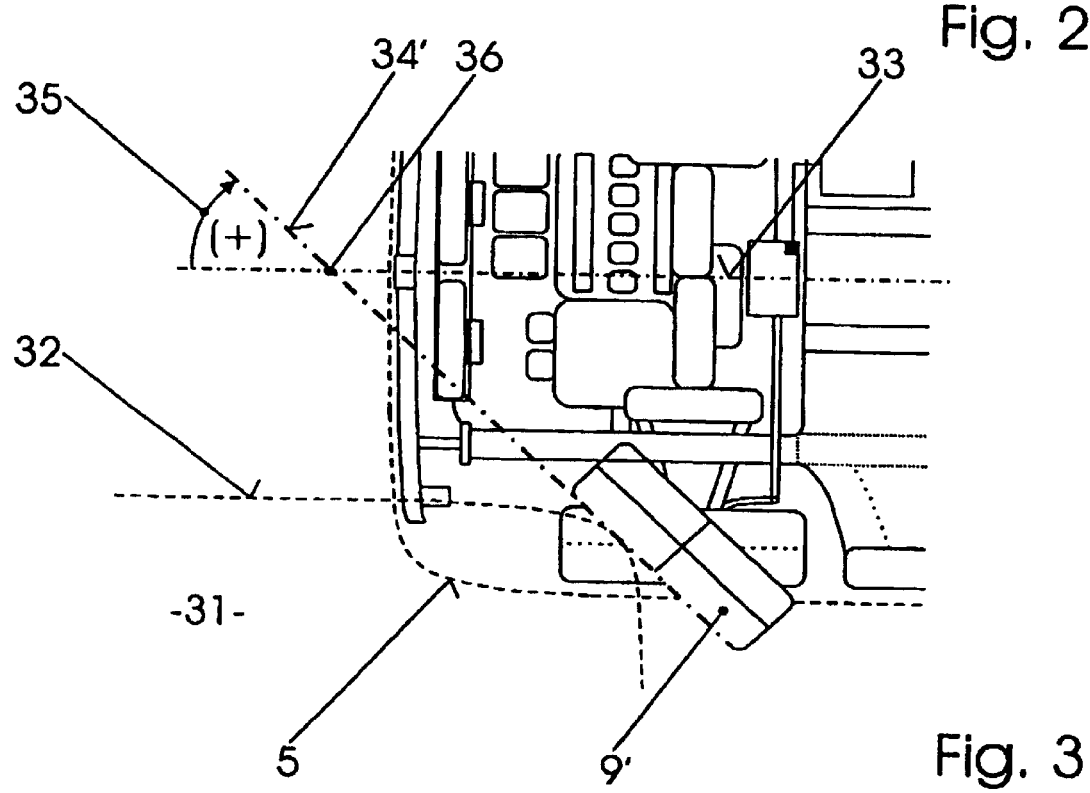
FIG. 3 shows the same in a second phase, at the start of a collision.

As can be seen in FIG. 3, the wheel 9 thus assumes the position 9', in which its wheel plane is illustrated on the perspective plane by its track 34'. The latter intersects the vertical longitudinal central plane 33 of the vehicle at the point 36. This intersecting point, which is actually the projection of the intersecting line, is situated in front of the vehicle, this being referred to as a positive steering lock. The contour 32 of the collision partner 31 has already penetrated into the contour 5 of our vehicle and is in contact with the wheel plane 34', is actually in contact with the rim (not illustrated on its own) of this wheel. Because of the inclination of the wheel plane 34', the rim forms a shield which, firstly, pushes away our vehicle from the collision partner 31 and, secondly, experiences a force acting to the right and rearward on the wheel 9'.

Figure 4:
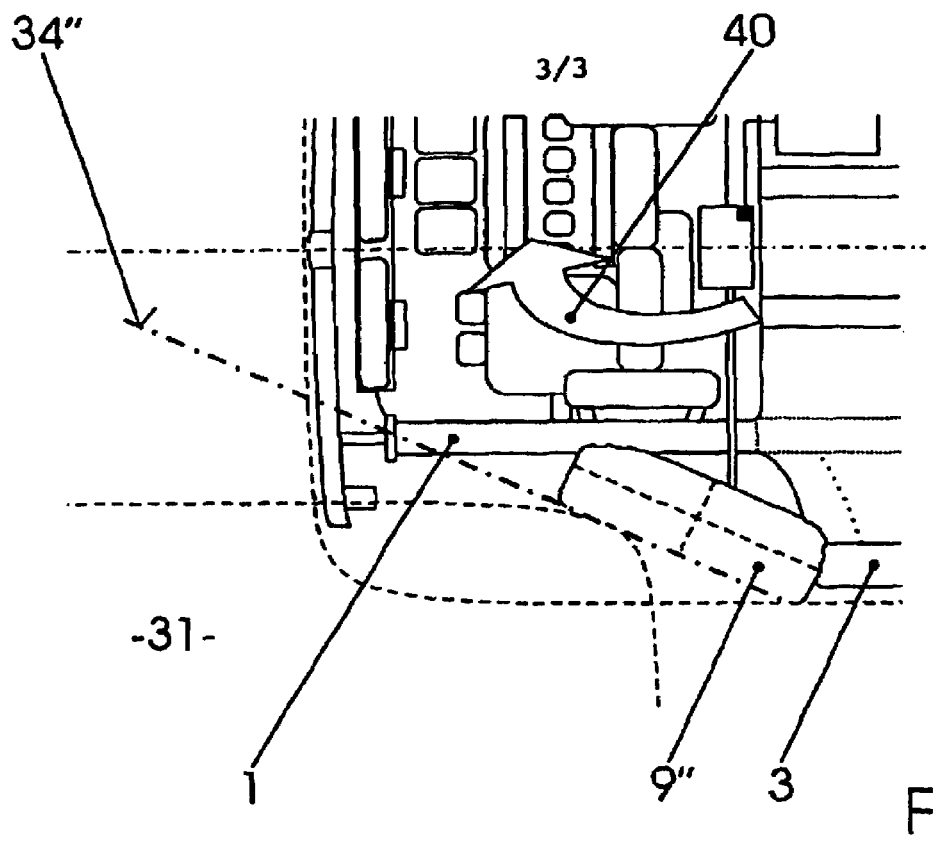
FIG. 4 shows the same in a third phase, during the collision.

It can be seen in FIG. 4 that this force which acts to the right and rearward displaces our collision-side front wheel in such a manner, with the wheel suspension being destroyed, that it bears against the sill 3 and against the frame longitudinal member 1. In this position 9', the wheel can absorb even greater forces without penetrating itself into the interior of the vehicle, and deflects our vehicle, without decelerating it to a hazardous extent, in the direction of the arrow 40. This lateral deflection of the vehicle can be lessened by the right front wheel 10 turning in an opposite direction. Measurements and simulation calculations have revealed that collisions which could be lethal for the occupants of our vehicle if the front wheels interlock thereby escape with only relatively small deceleration forces. The consequences are substantially lessened even for the occupants of the collision partner 31.

Figure 5:
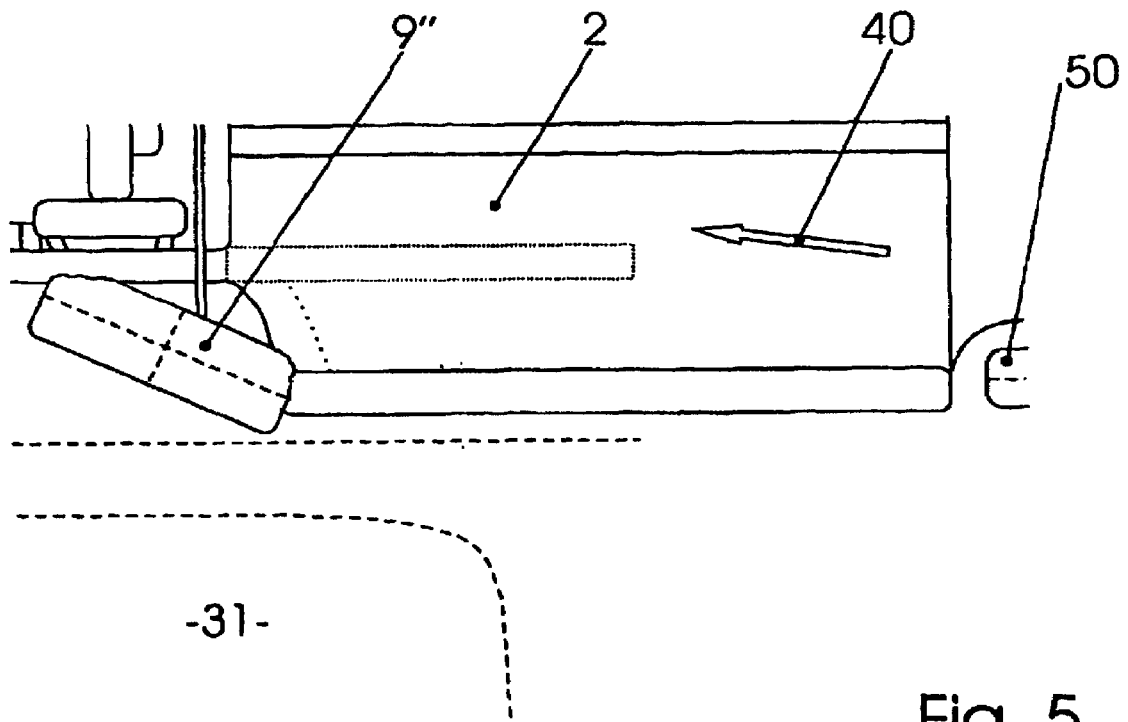
FIG. 5 shows the same in a fourth phase, after the collision.

FIG. 5 shows our vehicle after the collision; it continues its movement in accordance with the directional arrow 40. For orientation purposes, the left rear wheel 50 is still indicated.

The invention claimed is:

1. A method for damage limitation in a partially overlapping frontal collision of two motor vehicles, comprising the steps of indicating by signal means the start of a collision or an imminent collision, and, upon indication, triggering a discharge from an energy source which causes at least one steerable front wheel (9, 10) of one of the two motor vehicles to be turned relative to the other steerable front wheel in such a manner that a wheel plane (34) of a collision-side wheel (9) intersects a vertical longitudinal central plane (33) of the vehicle at a point (36) in front of the vehicle.

2. The method as claimed in claim 1, wherein the signal means comprises a deceleration sensor (22) arranged in front of the wheel (9, 10).

3. The method as claimed in claim 1, wherein the signal means comprises a proximity detector (20).

4. The method as claimed in claim 1, including turning the two front wheels (9, 10) in an opposite direction.

5. A method for damage limitation in a partially overlapping frontal collision of two motor vehicles, comprising the steps of indicating by signal means the start of a collision or an imminent collision, and, upon indication, triggering a discharge from an energy source which causes at least one steerable front wheel (9, 10) of one of the two motor vehicles to be turned in such a manner that a wheel plane (34) of a collision-side wheel (9) intersects a vertical longitudinal central plane (33) of the vehicle at a point (36) in front of the vehicle, and further including turning the two front wheels (9, 10) in an opposite direction.

6. A motor vehicle comprising a device for damage limitation in the event of a partially overlapping frontal collision, the motor vehicle includes steerable front wheels (9, 10) and a steering device (13, 14, 15, 16), a connecting element (17) having means (24) for the build up of a pressure provided on the steering device (13, 14, 15, 16), wherein, in the event of a collision, the connecting element (17) and means (24) acts on the steering device (13, 14, 15, 16) for turning at least a collision-side front wheel (9) relative to the other steerable front wheel.

7. The motor vehicle as claimed in claim 6, wherein the means (24) for the build up of a pressure comprises an explosive charge, and a control unit (18) ignites the explosive charge by a control command given by the control unit (18).

8. The motor vehicle as claimed in claim 6, wherein the steering device further includes a steering tie rod, wherein the connecting element (17) is fitted between a first part (15) of the steering tie rod leading to one front wheel (9) and a second part (16) of the steering tie rod leads to the other front wheel (10).

9. The motor vehicle as claimed in claim 6, wherein the steering device further includes a steering tie rod (15, 16) arranged behind a front axle, wherein, in the event of a collision, the connecting element (17) increases distance between a first part of the steering tie rod (15) which leads to one front wheel (9) and a second part of the steering tie rod (16) which leads to the other front wheel (9).

10. The motor vehicle as claimed in claim 6, wherein the steering device further includes a steering tie rod arranged in front of a front axle, wherein, in the event of a collision, the connecting element (17) reduces distance between a first part of the steering tie rod which leads to one front wheel and a second part of the steering tie rod which leads to the other front wheel.

11. The motor vehicle as claimed in claim 6, further including a steering rack, wherein the connecting element is fitted between the steering rack and a part of a steering tie rod leading to a front wheel.

12. A motor vehicle comprising a device for damage limitation in the event of a partially overlapping frontal collision, the motor vehicle includes steerable front wheels (9, 10) and a steering device (13, 14, 15, 16), a connecting element (17) having means (24) for the build up of a pressure provided on the steering device (13, 14, 15, 16), wherein, in the event of a collision, the connecting element (17) and means (24) acts on the steering device (13, 14, 15, 16) for turning at least a collision-side front wheel (9), and wherein the steering device further includes a steering tie rod (15, 16) arranged behind a front axle, wherein, in the event of a collision, the connecting element (17) increases distance between a first part of the steering tie rod (15) which leads to one front wheel (9) and a second part of the steering tie rod (16) which leads to the other front wheel (9).

13. A motor vehicle comprising a device for damage limitation in the event of a partially overlapping frontal collision, the motor vehicle includes steerable front wheels (9, 10) and a steering device (13, 14, 15, 16), a connecting element (17) having means (24) for the build up of a pressure provided on the steering device (13, 14, 15, 16), wherein, in the event of a collision, the connecting element (17) and means (24) acts on the steering device (13, 14, 15, 16) for turning at least a collision-side front wheel (9), and wherein the steering device further includes a steering tie rod arranged in front of a front axle, wherein, in the event of a collision, the connecting element (17) reduces distance between a first part of the steering tie rod which leads to one front wheel and a second part of the steering tie rod which leads to the other front wheel.

14. A motor vehicle comprising a device for damage limitation in the event of a partially overlapping frontal collision, the motor vehicle includes steerable front wheels (9, 10) and a steering device (13, 14, 15, 16), a connecting element (17) having means (24) for the build up of a pressure provided on the steering device (13, 14, 15, 16), wherein, in the event of a collision, the connecting element (17) and means (24) acts on the steering device (13, 14, 15, 16) for turning at least a collision-side front wheel (9), and further including a steering rack, wherein the connecting element is fitted between the steering rack and a part of a steering tie rod leading to a front wheel.

* * * * *